United States Patent Office 3,076,024
Patented Jan. 29, 1963

3,076,024
ACYLATED 3,5-DIAMINOPOLYHALOBENZOIC ACIDS
Aubrey A. Larsen, Schodack Center, N.Y., assignor to Sterling Drug Inc., New York, N.Y., a corporation of Delaware
No Drawing. Filed Feb. 19, 1954, Ser. No. 411,573
21 Claims. (Cl. 260—490)

This invention relates to new and useful acylated 3,5-diaminopolyhalobenzoic acids and to their preparation. The invention relates particularly to compounds having the formula

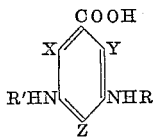

wherein X, Y and Z are members of the group consisting of hydrogen, bromine and iodine atoms, at least two of X, Y and Z being halogen atoms, and R and R' are members of the group consisting of hydrogen and lower-alkanoyl, hydroxy-lower-alkanoyl and lower-alkanoyloxy-lower-alkanoyl radicals, at least one of R and R' being an acyl radical, i.e., lower-alkanoyl, hydroxy-lower-alkanoyl or lower-alkanoyloxy-lower-alkanoyl, and the sum of the number of carbon atoms in R and R' being not greater than ten.

My new compounds are useful as radiopaque agents and are particularly valuable in the form of non-toxic, water-soluble salts as intravenous urographic agents for excretory urography or retrograde pyelography, or as intravenous cholecystographic agents. Many of the members of low molecular weight, i.e., where R and R' have one or two carbon atoms, possess an extraordinarily low intravenous toxicity, being considerably less toxic than any of the intravenous urographic agents which have been used up to the present time. The members of higher molecular weight are useful as intravenous cholecystrographic agents.

This invention also relates to intermediate compounds having the formula

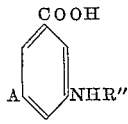

wherein A is selected from the group consisting of nitro and amino groups, and R" is a lower-alkanoyl group. The lower-alkanoyl group preferably has from one to about eight carbon atoms. The latter compounds are useful both as intermediates in preparing the above-described halogenated compounds and also as antitubercular agents.

The invention envisages compounds of the following structures:

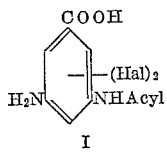

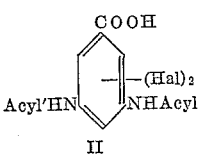

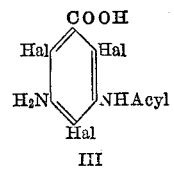

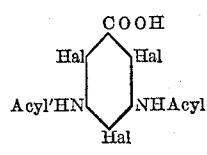

In the above formulas Hal stands for halogen including bromine and iodine. The halogen atoms in the ring can be the same or different. Acyl and Acyl' stand for lower-alkanoyl, hydroxy-lower-alkanoyl or lower-alkanoyloxy-lower-alkanoyl radicals. By lower-alkanoyl is meant an acyl radical derived from a straight or branched chain lower fatty acid having from one to about eight carbon atoms and having no substituent groups; thus, lower-alkanoyl can be any of such groups as formyl, acetyl, propionyl, butyryl, isobutyryl, valeryl, isovaleryl, caproyl, isocaproyl, heptanoyl, octanoyl, and the like. The hydroxy-lower-alkanoyl group is one of the above lower-alkanoyl groups (except formyl) substituted at any point in the chain by a hydroxyl group; thus, hydroxy-lower-alkanoyl can be any of such groups as glycolyl (hydroxyacetyl), α-hydroxypropionyl, β-hydroxypropionyl, and the various hydroxybutyryl, hydroxyisobutyryl, hydroxyvaleryl, hydroxyisovaleryl, hydroxycaproyl, hydroxyisocaproyl, hydroxyheptanoyl, hydroxyoctanoyl, and the like radicals. The lower-alkanoyloxy-lower-alkanoyl group is the alkanoate ester of one of the above hydroxy-lower-alkanoyl groups; thus, lower-alkanoyloxy-lower-alkanoyl can be one of such groups as acetoxyacetyl, propionoxyacetyl, butyryloxyacetyl, α-acetoxypropionyl, β-acetoxypropionyl, acetoxybutyryl, propionoxybutyryl, butyryloxybutyryl, acetoxyisobutyryl, acetoxyvaleryl, propionoxyvaleryl, butyryloxyvaleryl, acetoxyisovaleryl, acetoxycaproyl, propionoxycaproyl, butyryloxycaproyl, acetoxyisocaproyl, acetoxyheptanoyl, acetoxyoctanoyl, and the like radicals. In the Formulas II and IV the two acyl groups can be the same or different.

The compounds of Formula I can be synthesized by the following scheme:

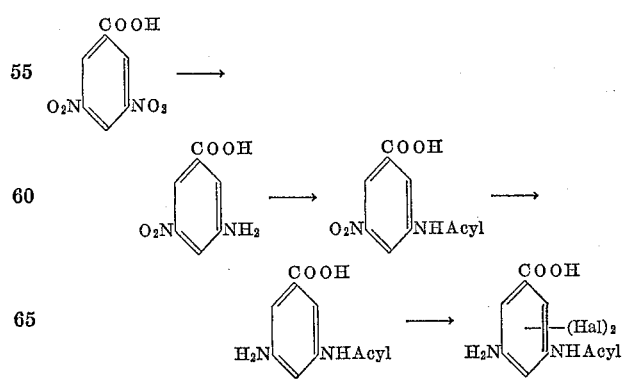

3,5-dinitrobenzoic acid is selectively reduced, using, for example, ammonium sulfide, to 3-nitro-5-aminobenzoic acid. The latter is then acylated by heating with an acid anhydride or acid halide, or sometimes with a free acid as in the case of formic acid and the hydroxy-acids which do not form acid anhydrides or acid halides. The acylation reaction is promoted by the addition of a trace of a strong acid, such as sulfuric acid, perchloric acid or an organic sulfonic acid, as a catalyst, although the reaction will still take place, although more slowly, in the absence of the catalyst. The lower-alkanoyloxy-lower-alkanoyl group is introduced either by acylation of a hydroxy-lower-alkanoyl group already present, or by acylation of the free amino group with a lower-alkanoyloxy-lower-alkanoyl halide or anhydride. The resulting 3-nitro-5-acylaminobenzoic acid is then reduced, either catalytically or chemically, to a 3-amino-5-acylaminobenzoic acid by methods known to reduce a nitro group to an amino group without effecting the other groups present, i.e., the acylamino and carboxyl groups or the aromatic ring. Preferred methods for this reduction comprise catalytically hydrogenating in the presence of Raney nickel catalyst, or treating the 3-nitro-5-acylaminobenzoic acid with hydrazine in the presence of Raney nickel.

The final step in the synthesis of compounds of structure I is a halogenation process wherein two equivalents of halogenating agent are employed. The halogenating agent can be elementary bromine, elementary iodine or any of the various halogenating agents which afford available elementary bromine or iodine. Such agents include pyridine bromide hydrobromide, N-bromoamides, iodine monochloride, potassium iododichloride ($KICl_2$, a complex of potassium chloride and iodine monochloride), the pyridine-iodine monochloride complex and the like. The exact position of the halogen atoms in the dihalo compounds of structure I is not known; it is believed that mixtures of isomers are obtained in some cases.

The 3.5-diacylaminodiiodobenzoic acids of Formula II are produced by acylation of compounds of Formula I by methods analogous to that described above for the acylation of 3-nitro-5-aminobenzoic acid.

The compounds of Formula III are prepared by exhaustive halogenation of a 3-amino-5-acylaminobenzoic acid. All of the halogens can be bromine, all can be iodine, or one or two can be bromine and the remainder iodine. The mixed types can be prepared by treating the 3-amino-5-acylaminobenzoic acid with one or two equivalents of a halogenating agent followed by a second halogenation with an excess of another halogenating agent in which the halogen is different from that of the first halogenating agent. A corollary to the foregoing is the fact that compounds of Formula III can be prepared from compounds of Formula I by further halogenation; in this case the halogen atoms in structure III can be the same or different.

If the third halogen atom to be introduced in compounds of Formula III is iodine, it is necessary to neutralize the acid produced in the halogenation reaction by the addition of equivalent amounts of a basic substance such as sodium acetate or sodium hydroxide. For example, if a 3-amino-5-acylaminobenzoic acid is treated with an excess of iodine monochloride in neutral or acidic medium only a diiodo compound is formed. The hydrogen chloride formed in the reaction produces an acid-addition salt of the free amino group thus deactivating the diiodo derivative toward further nuclear iodination. If, however, the hydrogen chloride is neutralized by addition of a basic substance, the third iodine atom is readily introduced.

The 3,5-diacylamino-2,4,6-trihalobenzoic acids of Formula IV are produced by acylation of compounds of Formula III; however, if Acyl and Acyl' are the same and all of the halogens are the same, the following scheme is preferably followed:

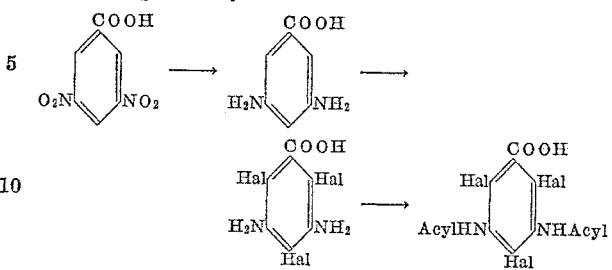

Both nitro groups of 3,5-dinitrobenzoic acid are reduced to give 3,5-diaminobenzoic acid. Exhaustive halogenation of the latter gives 3,5-diamino-2,4,6-trihalobenzoic acid, which is then diacylated. The triiodination of 3,5-diaminobenzoic acid takes place readily with iodine monochloride in acid medium.

For intravenous administration my compounds are used in the form of non-toxic salts derived from neutralization of the acids with non-toxic inorganic or organic bases such as the alkali metal hydroxides, ammonium hydroxide, alkyl amines, alkanol amines and the like, and these salts are within the purview of the invention. The sodium salt is preferred, although the diethylamine, diethanolamine or methylglucamine salts can also be used with advantage.

The following examples will illustrate my invention more fully.

EXAMPLE 1

(a) *5-amino-3-nitrobenzoic acid.*—A mixture of 212 g. (1 mole) of 3,5-dinitrobenzoic acid, 1.4 liters of water and 210 ml. of concentrated ammonium hydroxide was heated to 70° C. A stream of hydrogen sulfide was passed through the mixture at such a rate that the temperature was maintained at 75–80° C. About forty-fifty minutes after the addition of hydrogen sulfide was begun, the mixture was diluted with 800 ml. of hot water and acidified with 500 ml. of concentrated hydrochloric acid. After cooling, the yellow sulfur cake was removed by filtration, and the filtrate was treated with solid sodium carbonate to the point of maximum precipitation, about pH 3, and the orange-yellow product was collected by filtration. After recrystallization from 3–3.5 liters of water, about 160 g. of 5-amino-3-nitrobenzoic acid, M.P. 211–213° C., was obtained.

(b) *5-acetamido-3-nitrobenzoic acid.*—5-amino-3-nitrobenzoic acid (70 g., 0.385 mole) was dissolved in 750 ml. of water containing an equivalent amount of sodium hydroxide, the solution was heated to 40° C., and 43 ml. of acetic anhydride was added with vigorous stirring. After about one hour the yellow solid which had formed was collected by filtration, washed with water and dried, giving 80 g. of 5-acetamido-3-nitrobenzoic acid, M.P. 291–295° C. (dec.).

(c) *5-acetamido-3-aminobenzoic acid.*—A solution of 112 g. (0.5 mole) of 5-acetamido-3-nitrobenzoic acid in 100 ml. of concentrated ammonium hydroxide and 900 ml. of water was hydrogenated under elevated pressure in the presence of Raney nickel catalyst. After about two hours the calculated amount of hydrogen had been taken up, the solution was filtered, and the filtrate acidified with 60 ml. of acetic acid and cooled to 0° C. for about fifteen hours. The resulting white solid was collected by filtration, washed with water and dried, giving 75 g. of 5-acetamido-3-aminobenzoic acid, M.P. 223–225° C.

(d) *5 - acetamido - 3 - aminodiiodobenzoic acid.*—A stirred suspension of 73.5 g. of 5-acetamido-3-aminobenzoic acid in 2 liters of water was treated with 140 ml. of concentrated hydrochloric acid, and then a solution of 60 ml. of iodine monochloride in 125 ml. of 6N hydrochloric acid was added all at once. The mixture was stirred for one hour, and then the solid was collected by filtration, washed with water and then dissolved in dilute alkali. The alkaline solution was gradually neutralized with acid and sodium bisulfite was added at pH 7. Additional acid was added whereupon the organic acid precipitated. The latter was collected by filtration, giving 120 g., M.P. 207–210° C. with decomposition. For further purification the product was dissolved in dilute ammonium hydroxide and then brought to pH 7 with acetic acid, and the solution was decolorized with charcoal. The solution was then diluted to a volume of 2 liters, and the organic acid was precipitated by the addition of hydrochloric acid. The 5-acetamido-3-aminodiiodobenzoic acid thus obtained had a M.P. about 215° C. with decomposition.

*Analysis.*—Calcd. for $C_9H_8I_2N_2O_3$: I, 56.9; N, 6.28. Found: I, 57.1; N, 6.16.

EXAMPLE 2

3,5-Diacetamidodiiodobenzoic Acid

A mixture of 120 g. of 5-acetamido-3-aminodiiodobenzoic acid (prepared as described in Example 1 above), 1.1 liters of acetic anhydride and 2.5 ml. of 70% perchloric acid was refluxed for three hours. The solution was then poured into about 2 liters of water and stirred until the oil which had separated turned solid. This solid was removed by filtration, the filtrate was cooled for six hours, and the light tan solid which separated was collected by filtration, giving 54 g., M.P. 247–250° C. The product was then dissolved in 3 liters of dilute sodium hydroxide solution, the solution was filtered and the filtrate acidified, giving 50 g. of 3,5-diacetamidodiiodobenzoic acid. The product was further purified by recrystallization from water, giving a sample melting about 238–41° C. with decomposition.

Neut. Equiv. Calcd.: 488. Found: 485.

*Analysis.*—Calcd. for $C_{11}H_{10}I_2N_2O_4$: I, 52.0. Found: I, 52.2.

The intravenous toxicity of the sodium salt of 3,5-diacetamidodiiodobenzoic acid was measured in mice. The amount lethal to 50% of the animals treated, $LD_{50}$, was approximately equal to 13,100 mg./kg. of body weight.

When administered intravenously to rabbits or cats, sodium 3,5-diacetamidodiiodobenzoic acid readily outlines the kidneys and urinary bladder in X-ray pictures.

EXAMPLE 3

5-Acetamido-3-Propionamidodiiodobenzoic Acid

A mixture of 33.4 g. of 5-acetamido-3-aminodiiodobenzoic acid, 100 ml. of propionic anhydride and 15 drops of sulfuric acid was heated on a steam bath for fifteen minutes. The mixture was cooled and the resulting solid (29 g.) was collected by filtration. This product was then recrystallized first from dimethylformamide and then from a mixture of dimethylformamide and methanol, giving 15 g. of 5-acetamido-3-propionamidodiiodobenzoic acid, M.P. about 240° C. with decomposition.

Neut. Equiv. Calcd.: 502. Found: 497.

*Analysis.*—Calcd. for $C_{12}H_{12}I_2N_2O_4$: I, 50.2. Found: I, 50.6.

EXAMPLE 4

5-Acetamido-3-Butyramidodiiodobenzoic Acid

A mixture of 50 g. of 5-acetamido-3-aminodiiodobenzoic acid, 250 ml. of butyric anhydride and 5 drops of concentrated sulfuric acid was heated on a steam bath for two hours. The solid was collected by filtration and washed with petroleum ether (Skellysolve B), giving 43 g. of 5-acetamido-3-butyramidodiiodobenzoic acid, M.P. about 215–220° C. with decomposition. The product was further purified by recrystallization from ethanol, giving a sample melting about 225–228° C. with decomposition.

EXAMPLE 5

5-Acetamido-3-Amino-2,4,6-Triiodobenzoic Acid (a) *From 5-acetamido-3-aminodiiodobenzoic acid.*—A solution of 22.3 g. (0.05 mole) of 5-acetamido-3-aminodiiodobenzoic acid, prepared as described above in Example 1, part (d), in 200 ml. of water and 25 ml. of 2 N sodium hydroxide solution was treated with stirring over a twenty minute period with 30 ml. of 2 M potassium iododichloride. The mixture was stirred for an additional twenty minutes and then the brown solid which formed was collected by filtration and washed with water. The material thus obtained (27 g.) was suspended in 75 ml. of saturated ammonium chloride solution, the mixture was heated on a steam bath and an excess of concentrated ammonium hydroxide was added. After cooling, the ammonium salt was collected by filtration, dissolved in water, decolorized with charcoal, and the product precipitated with dilute hydrochloric acid, giving 21 g. of 5-acetamido-3-amino-2,4,6-triiodobenzoic acid, M.P. 258–260° C. (dec.).

Neut. Equiv. Calcd.: 572. Found: 572.

*Analysis.*—Calcd. for $C_9H_7I_3N_2O_3$: I, 66.6. Found: I, 66.7.

(b) *From 5-acetamido-3-aminobenzoic acid.*—A stirred suspension of 9.7 g. (0.05 mole) of 5-acetamido-3-aminobenzoic acid, prepared as described above in Example 1, part (c), in 100 ml. of water was treated simultaneously with 75 ml. of 2 N sodium hydroxide solution and 80 ml. of 2 M potassium iododichloride. The addition of the reagents was so regulated that the potassium iododichloride solution lagged behind the sodium hydroxide solution by about 15 ml. After stirring for 15–20 minutes the gray solid which formed was collected by filtration and washed with water, giving about 25 g. of product, M.P. 200–210° C. This material was purified through the ammonium salt as described above in part (a), giving about 14 g. of 5-acetamido-3-amino-2,4,6-triiodobenzoic acid, M.P. 263–266° C.

EXAMPLE 6

5-Acetamido-3-Formamido-2,4,6-Triiodobenzoic Acid

A suspension of 37 g. of 5-acetamido-3-amino-2,4,6-triiodobenzoic acid, prepared as described above in Example 5, in 200 ml. of 87% formic acid was stirred and heated to 70° C. Acetic anhydride (195 ml.) was added at such a rate that the temperature was maintained at 75° C., which took about one hour. The mixture was warmed on a steam bath for one hour, 135 ml. of water was added and the mixture allowed to cool. The solid product was collected by filtration giving 27 g. of material, M.P. 243–246° C. Recrystallization from the latter from alcohol gave 15 g. of 5-acetamido-3-formamido-2,4,6-triiodobenzoic acid, M.P. 277–278° C. (dec.).

Neut. Equiv. Calcd.: 600. Found: 597

*Analysis.*—Calcd. for $C_{10}H_7I_3N_2O_4$: I, 63.46. Found: I, 63.03.

A suspension of 74.5 g. of 5-acetamido-3-formamido-2,4,6-triiodobenzoic acid in 200 ml. of isopropyl alcohol was treated with 60 ml. of 2 N sodium hydroxide solution. The mixture was heated on a steam bath and 40 ml. of water was added to effect solution. Upon cooling and stirring the mixture the 5-acetamido-3-formamido-2,4,6-triiodobenzoic acid separated in the form of its sodium salt, which was collected by filtration, washed with acetone and dried at 50° C. for five hours and then at 70° C. overnight. There was thus obtained 62 g. of sodium 5-acetamido-3-formamido - 2,4,6 - triiodobenzoate. The analytic sample was obtained from recrystallization from a mixture of isopropyl alcohol and methyl alcohol.

*Analysis.*—Calcd. for $C_{10}H_6I_3N_2NaO_4$: I, 61.22; Na, 3.70. Found: I, 61.00; Na, 3.58.

EXAMPLE 7

5-Acetamido-3-Propionamido-2,4,6-Triiodobenzoic Acid

A mixture of 34.3 g. of 5-acetamido-3-amino-2,4,6-triiodobenzoic acid, prepared as described above in Example 5, 150 ml. of propionic anhydride and 9 drops of concentrated sulfuric acid was heated on a steam bath for three hours. The mixture was cooled and the solid product which separated was collected by filtration, washed with petroleum ether and dried. The 35 g. of material thus obtained was dissolved in dilute ammonium hydroxide, decolorized with charcoal and reprecipitated by acidification. The latter product was collected by filtration, washed with water, dried, suspended in absolute ethanol and heated for one and one-half hours, and again separated and dried, giving about 30 g. of 5-acetamido-3-propionamido-2,4,6-triiodobenzoic acid, M.P. above 300° C. (dec.).

*Analysis.*—Calcd. for $C_{12}H_{11}I_3N_2O_4$: I, 60.7. Found: I, 61.0.

EXAMPLE 8

*5-acetamido-3-butyramido-2,4,6-triiodobenzoic acid* was obtained from 28.5 g. of 5-acetamido-3-amino-2,4,6-triiodobenzoic acid, 125 ml. of butyric anhydride and 6 drops of concentrated sulfuric acid by the manipulative procedure described above in Example 7. There was thus obtained 21 g. of 5-acetamido-3-butyramido-2,4,6-triiodobenzoic acid with a M.P. above 300° C. (dec.).

Neut. Equiv. Calcd.: 642. Found: 641.

*Analysis.*—Calcd. for $C_{13}H_{13}I_3N_2O_4$: I, 59.4. Found: I, 59.5.

EXAMPLE 9

5-Acetamido-3-Isocaproamido-2,4,6-Triiodobenzoic Acid

A mixture of 28.6 g. of 5-acetamido-3-amino-2,4,6-triiodobenzoic acid, prepared as described above in Example 5, and 60 ml. of isocaproyl chloride was refluxed for thirty minutes. The thick paste which formed was then poured into ice water, and the mixture was made basic with ammonium hydroxide and warmed slightly. The mixture was filtered, the filtrate acidified, and the solid which separated was collected by filtration, washed with water and dried. The 24.5 g. of material thus obtained was recrystallized from dilute methanol, using activated charcoal for decolorizing purposes, and the recrystallized material was washed with ether and dried at 100° C. for about fifteen hours, giving 14 g. of 5-acetamido-3-isocaproamido-2,4,6-triiodobenzoic acid, M.P. about 284° C. (dec.).

Neut. Equiv. Calcd.: 670. Found: 669.

*Analysis.*—Calcd. for $C_{15}H_{17}I_3N_2O_4$: I, 56.8. Found: I, 56.3.

EXAMPLE 10

(*a*) *3-amino-5-propionamidobenzoic acid.*—5-amino-3-nitrobenzoic acid (100 g.) was added to 270 ml. of 2 N sodium hydroxide and the mixture was diluted with 900 ml. of warm water to effect complete solution. Propionic anhydride (89 ml.) was then added; heat was evolved, and the mixture allowed to return to room temperature. The solid which had separated was collected by filtration, washed with water and dried, giving 98 g. of 5-propionamido-3-nitrobenzoic acid, M.P. 241–243° C. The latter was dissolved in 780 ml. of dilute ammonium hydroxide and hydrogenated with Raney nickel catalyst at a pressure of 500 lbs. per sq. inch. After the calculated amount of hydrogen necessary to reduce the nitro group had been taken up, the catalyst was removed by filtration and the filtrate acidified with acetic acid. The product which precipitated was collected by filtration and recrystallized from ethanol, using charcoal for decolorizing purposes, giving 63 g. of 3-amino-5-propionamidobenzoic acid, M.P. 206.5–208° C.

Neut. Equiv. Calcd.: 208. Found: 209.

*Analysis.*—Calcd. for $C_{10}H_{12}N_2O_3$: N, 13.5. Found: N, 13.5.

(*b*) *3 - amino-5-propionamidodiiodobenzoic acid.*—3-amino-5-propionamidobenzoic acid (41 g.) was iodinated with 30 ml. of iodine monochloride in 100 ml. of 6 N hydrochloric acid by the manipulative procedure described in Example 1, part (*d*). The crude product was dissolved in hot ethanol, decolorized with charcoal, an excess of dibutylamine was added, and the dibutylamine salt of 3-amino-5-propionamido-diiodobenzoic acid which separated was collected by filtration and dissolved in 10% sodium hydroxide solution. The solution was diluted with water and acidified with hydrochloric acid to give 36 g. of 3-amino-5-propionamidodiiodobenzoic acid, M.P. about 210–212° C. with decomposition.

Neut. Equiv. Calcd.: 460. Found: 460.

*Analysis.*—Calcd. for $C_{10}H_{10}I_2N_2O_3$: I, 55.2. Found: I, 55.7.

The toxicity of 3-amino-5-propionamidodiiodobenzoic acid was measured in mice, and an approximate $LD_{50}$ value of 10,000 mg./kg. was found.

EXAMPLE 11

(*a*) *3-amino-5-butyramidobenzoic acid* was prepared from 100 g. of 5-amino-3-nitrobenzoic acid and 160 ml. of butyric anhydride, followed by hydrogenation of the intermediate 5-butyramido-3-nitrobenzoic acid, M.P. 243–245° C. by the method described in Example 10, part (*a*). There was thus obtained 75 g. of 3-amino-5-butyramidobenzoic acid, M.P. 234–43° C. Recrystallization from ethanol gave a sample melting at 237–238° C.

Neut. Equiv. Calcd.: 222. Found: 223.

*Analysis.*—Calcd. for $C_{11}H_{14}N_2O_3$: N, 12.61. Found: N, 12.76.

(*b*) *3-amino-5-butyramidodiiodobenzoic acid* was prepared from 35 g. of 3-amino-5-butyramidobenzoic acid and 28 ml. of iodine monochloride by the method described above in Example 1, part (*d*). There was thus obtained 32 g. of 3-amino-5-butyramidodiiodobenzoic acid, M.P. about 206–208° C. with decomposition.

Neut. Equiv. Calcd.: 474. Found: 474.

*Analysis.*—Calcd. for $C_{11}H_{12}I_2N_2O_3$: I, 53.6. Found: I, 53.8.

EXAMPLE 12

3-Acetamido-5-Butyramidodiiodobenzoic Acid 3-amino-5-butyramidodiiodobenzoic acid (12 g.) was suspended in 25 ml. of acetic anhydride and heated to get as much in solution as possible. The hot mixture was filtered, the filtrate was cooled slightly and 5 drops of sulfuric acid were added. The mixture was heated on a steam bath for thirty minutes and poured into 1 liter of ice water. The water was decanted and the residual oil was dissolved in dilute sodium hydroxide, the solution was filtered and the filtrate acidified with hydrochloric acid. The precipitated acid was collected by filtration, washed with water, and recrystallized first from acetic acid and then from methanol, giving, after drying at 100° C., 3-acetamido-5-butyramidodiiodobenzoic acid, M.P. about 220–225° C. with decomposition.

Neut. Equiv. Calcd.: 516. Found: 517.

*Analysis.*—Calcd. for $C_{13}H_{14}I_2N_2O_4$: I, 49.2. Found: I, 49.4.

EXAMPLE 13

(*a*) *3-amino-5-formamidobenzoic acid.*—A mixture of 91 g. of 5-amino-3-nitrobenzoic acid and 200 ml. of 98% formic acid was heated on a steam bath. The mixture was then poured into 500 ml. of water, and the solid which separated was collected by filtration and dried, giving 103 g. of 5-formamido-3-nitrobenzoic acid, M.P. 229–231° C. The latter was dissolved in 800 ml. of dilute ammonium hydroxide and hydrogenated in the presence of Raney nickel catalyst. The catalyst was removed by filtration, and the filtrate was acidified with acetic acid, cooled, and the product collected by filtration, giving 69 g. of 3-amino-5-formamidobenzoic acid, M.P. above 325° C.

Neut. Equiv. Calcd.: 180. Found 178.

(b) *3-amino-5-formamidodiiodobenzoic acid* can be prepared by treatment of 5-formamido-3-aminobenzoic acid with iodine monochloride, care being taken to avoid hydrolysis of the formyl group.

EXAMPLE 14

(a) *5-hydroxyacetamido-3-nitrobenzoic acid.*—A mixture of 100 g. of 5-amino-3-nitrobenzoic acid and 110 g. of 70% glycolic acid was heated until the mixture reached a temperature of 148–50° C. The hot liquid was poured into 3 liters of ice water and allowed to stand for about fifteen hours. The resulting solid was collected by filtration, washed with water and dissolved in 2 liters of dilute sodium hydroxide. This solution was acidified with hydrochloric acid, and the precipitated acid was collected by filtration, giving 79 g. of 5-hydroxyacetamido-3-nitrobenzoic acid, M.P. 238–240° C.

(b) *3-amino-5-hydroxyacetamidodiiodobenzoic acid.*—A solution of 79 g. of 5-hydroxyacetamido-3-nitrobenzoic acid in 500 ml. of dilute ammonium hydroxide was hydrogenated in the presence of Raney nickel catalyst according to the method described in Example 1, part (c). The catalyst was removed by filtration, the filtrate acidified with acetic acid, and the precipitated solid collected by filtration and dried, giving 58 g. of 3-amino-5-hydroxyacetamidobenzoic acid, M.P. 209–211° C. The amino acid was suspended in 2800 ml. of water, and 280 ml. of concentrated HCl was added, followed by 45 ml. of iodine monochloride dissolved in 280 ml. of 6 N hydrochloric acid. After stirring for three and one-half hours, the solid material was collected by filtration, washed with water and dissolved in dilute sodium hydroxide. The alkaline solution was filtered, and the filtrate was acidified with hydrochloric acid, giving 62 g. of 3-amino-5-hydroxyacetamidodiiodobenzoic acid, M.P. about 212–215° C. with decomposition.

Neut. Equiv. Calcd.: 462. Found 473.

*Analysis.*—Calcd. for $C_9H_8I_2N_2O_4$: I, 55.0. Found: I, 54.6.

The toxicity of 3-amino-5-hydroxyacetamidodiiodobenzoic acid in the form of its diethanolamine salt was determined in mice, and an approximate $LD_{50}$ value of 7350 mg./kg. was found.

EXAMPLE 15

*3-Acetamido-5-Acetoxyacetamidodiiodobenzoic Acid*

3-amino-5-hydroxyacetamidodiiodobenzoic acid (50 g.), prepared as described in Example 14 was suspended in 73 ml. of acetic anhydride, 12 drops of sulfuric acid were added, and the mixture was heated on a steam bath with occasional stirring for forty minutes. The mixture was cooled, and the solid material (75 g.) collected by filtration, washed with petroleum ether (Skellysolve B) and recrystallized from acetic acid, giving 41 g. of 3-acetamido - 5 - acetoxyacetamidodiiodobenzoic acid, M.P. about 220–225° C. with decomposition. Another recrystallization from acetic acid gave a sample melting at about 238–239° C. with decomposition.

*Analysis.*—Calcd. for $C_{13}H_{12}I_2N_2O_6$: I, 45.5; C, 28.50; H, 2.16. Found: I, 45.8; C, 28.26; H, 2.31.

If in the foregoing procedure acetic anhydride is replaced by propionic anhydride there is produced 3-propionamido-5-propionoxyacetamidodiiodobenzoic acid.

EXAMPLE 16

*3-Acetamido-5-Hydroxyacetamidodiiodobenzoic Acid*

A paste of 23 g. of 3-acetamido-5-acetoxyacetamidodiiodobenzoic acid (prepared as described above in Example 15) in water was prepared, and 84 ml. of 1 N sodium hydroxide solution was gradually added keeping the solution slightly basic at all times. Toward the end of the addition of the alkali, the mixture was heated on a steam bath to between 40 and 50° C. and maintained at that temperature until the calculated amount of alkali had been consumed. The reaction mixture was filtered, the filtrate acidified with hydrochloric acid, and the solid which separated was collected by filtration, washed with water and dried, giving 20 g. of 3-acetamid-5-hydroxyacetamidodiiodobenzoic acid. Recrystallization from dilute ethanol gave a sample of the compound melting at about 217.5° C. (dec.).

Neut. Equiv. Calcd.: 504. Found: 505.

*Analysis.*—Calcd. for $C_{11}H_{10}I_2N_2O_5$: I, 50.4. Found: I, 50.4.

EXAMPLE 17

*3-Amino-5-Hydroxyacetamido-2,4,6-Triiodobenzoic Acid*

3-amino-5-hydroxyacetamidodiiodobenzoic acid (122 g.), prepared as described above in Example 14, part (b), was dissolved in 4500 ml. of water containing 125 ml. of 2 N sodium hydroxide solution. To this solution was slowly added 150 ml. of a 2 M iodine monochloride-3 M potassium chloride solution, and the mixture was stirred for two hours. The solid which separated was collected by filtration, washed with water, dried and purified through the ammonium salt by dissolving it in ammonium hydroxide, salting out the ammonium salt by addition of ammonium chloride, separating and dissolving the ammonium salt in water, decolorizing the solution with charcoal, and reprecipitating the acid with hydrochloric acid. The reprecipitated acid was collected by filtration, washed with water and dried, giving 105 g. of 3-amino-5-hydroxyacetmido - 2,4,6 - triiodobenzoic acid, M.P. about 244° C. (dec.).

Neut. Equiv. Calcd.: 588. Found: 587.

*Analysis.*—Calcd. for $C_9H_7I_3N_2O_4$: I, 64.9. Found: I, 64.5.

EXAMPLE 18

*3-Acetamido-5-Acetoxyacetamido-2,4,6-Triiodobenzoic Acid*

A mixture of 29.4 g. of 3-amino-5-hydroxyacetamido-2,4,6-triiodobenzoic acid, prepared as described above in Example 17, 125 ml. of acetic anhydride and 5 drops of concentrated sulfuric acid was heated rapidly on a hot plate. The mixture was filtered as soon as solution took place, and the filtrate was heated on a steam bath for one and one-half hours. The solid material was collected by filtration, washed with ether and acetone and dried for twenty-four hours at 100° C., giving 13 g. of 3-acetamido-5-acetoxyacetamido-2,4,6-triiodobenzoic acid, M.P. about 284–289° C. (dec.).

*Analysis.*—Calcd. for $C_{13}H_{11}I_3N_2O_6$: C, 23.3; H, 1.65; I, 56.8. Found: C, 23.70; H, 2.06; I, 56.6.

If in the foregoing procedure acetic anhydride is replaced by propionic anhydride there is produced 3-propionamido-5-propionoxyacetamido - 2,4,6 - triiodobenzoic acid.

EXAMPLE 19

*3-Acetamido-5-Hydroxyacetamido-2,4,6-Triiodobenzoic Acid*

The crude 3-acetamido-5-acetoxyacetamido-2,4-,6-triiodobenzoic acid obtained by acetylation of 41.2 g. of 3-amino-5-hydroxyacetamido-2,4,6-triiodobenzoic acid as described above in Example 18, was dissolved in 60 ml. of 1 N sodium hydroxide solution. The solution was warmed at 70–75° C. on a steam bath, and 55 ml. of additional 1 N sodium hydroxide solution was slowly added. The solution was filtered and acidified with hydrochloric acid. The solid which separated was collected by filtration, washed with water and dried. The 30 g. of material thus obtained was recrystallized from water, giving 20 g. of 3-acetamido-5-hydroxyacetamido-2,4,6-triiodobenzoic acid, M.P. 249.5–251.5° C. (dec.).

Neut. Equiv. Calcd.: 630. Found: 625.

*Analysis.*—Calcd. for $C_{11}H_9I_3N_2O_5$: I, 60.5. Found: I, 59.8.

3-acetamido-5-hydroxyacetamido - 2,4,6 - triiodobenzoic acid can be reacted with valeryl chloride to give 3-acetamido - 5 - valeryloxyacetamido - 2,4,6 - triiodobenzoic acid.

EXAMPLE 20

3,5-Diacetamido-2,4,6-Triiodobenzoic Acid (a) 3,5-dinitrobenzoic acid (15.9 g.) was dissolved in an equivalent amount of sodium hydroxide solution, and the solution was diluted to 310 ml. with water. The solution was refluxed with Raney nickel for fifteen minutes, filtered, and the filtrate was hydrogenated at elevated pressure using platinum oxide catalyst. After the amount of hydrogen calculated to reduce both nitro groups had been absorbed, the mixture was filtered, and the filtrate was acidified with an equal volume of concentrated hydrochloric acid. Iodine monochloride (17 ml.) in 100 ml. of 6 N HCl was then added with stirring. The reaction mixture was allowed to stand for two and one-half hours at room temperature, then diluted with an equal volume of water with vigorous stirring, and the solid material was collected by filtration and recrystallized from dilute methanol, giving 18.5 g. of 3,5-diamino-2,4,6-triiodobenzoic acid, M.P. about 135° C. with decomposition. The 18.5 g. of 3,5-diamino-2,4,6-triiodobenzoic acid was suspended in 150 ml. of acetic anhydride containing 5 drops of 70% perchloric acid, and the mixture was heated on a steam bath for three and one-half hours. The reaction mixture was poured into 300 ml. of ice water, and then heated on a steam bath until crystallization took place. The solid material was collected by filtration, dissolved in dilute sodium hydroxide solution, filtered, and hydrochloric acid was added to the filtrate to reprecipitate the acid product. The latter was again dissolved in sodium hydroxide and reprecipitated with acid, giving 9 g. of 3,5-diacetamido-2,4,6-triiodobenzoic acid, M.P. above 250° C. Five grams was dissolved in acetone, an excess of diethanolamine was added followed by ethyl acetate, whereupon 3,5-diacetamido-2,4,6-triiodobenzoic acid in the form of its diethanolamine salt separated. The latter when recrystallized from butanol had the M.P. 268–269° C. with decomposition.

*Analysis.*—Calcd. for $C_{11}H_9I_3N_2O_4 \cdot C_4H_{11}NO_2$: I, 53.1. Found: I, 52.6.

(b) A mixture of 57.2 g. of 3,5-diamino-2,4,6-triiodobenzoic acid, prepared as described in the previous paragraph, 280 ml. of acetic anhydride and 10 drops of concentrated sulfuric acid was warmed on a steam bath for one-half hour. The reaction mixture was cooled and the solid material was collected by filtration, giving 51.2 g. of product which was combined with 17 g. from another run and warmed with 250 ml. of ethanol containing 14 g. of diethanolamine. The diethanolamine salt of 3,5-diacetamido-2,4,6-triiodobenzoic acid thus formed was recrystallized by dissolving it in dilute ethanol and adding acetone until the solution became turbid, giving 62.5 g., which was then dissolved in 1 liter of water and acidified with hydrochloric acid to give 56.2 g. of 3,5-diacetamido-2,4,6-triiodobenzoic acid, M.P. above 300° C.

It was found that the crude 3,5-diacetamido-2,4,6-triiodobenzoic acid obtained from the iodination reaction mixture could be readily purified by dissolving in dilute ammonium hydroxide solution, decolorizing with charcoal, reprecipitating the free acid by the addition of hydrochloric acid and refluxing the now colorless product with 95% ethanol. The product could then be recrystallized from dimethylformamide, but this step proved not to be necessary. A 40% over-all yield of pure 3,5-diacetamido-2,4,6-triiodobenzoic acid, M.P. above 300° C., could be obtained from 3,5-dinitrobenzoic acid.

Neut. Equiv. Calcd.: 614. Found: 618.

*Analysis.*—Calcd. for $C_{11}H_9I_3N_2O_4$: I, 62.0. Found: I, 62.3.

(c) An equivalent amount of 2 N sodium hydroxide solution was added to 65 g. of crude 3,5-diacetamido-2,4,6-triiodobenzoic acid. The solution was filtered and the filtrate concentrated to dryness on a steam bath giving 70.8 g. of 3,5-diacetamido-2,4,6-triiodobenzoic acid in the form of its sodium salt. A 10 g. portion of the salt was dissolved in an ethanol-methanol mixture, and ether was added to precipitate the salt, giving 5.4 g. of sodium 3,5-diacetamido-2,4,6-triiodobenzoate, M.P. 280° C. with decomposition.

*Analysis.*—Calcd. for $C_{11}H_9I_3N_2O_4Na$: I, 59.9. Found: I, 60.1.

The intravenous toxicity of sodium 3,5-diacetamido-2,4,6-triiodobenzoate was measured in mice, and a $LD_{50}$ value of 15,000±815 mg./kg. was found. Injections and urograms were carried out in rabbits and cats in doses up to 4000 mg./kg. without evidence of toxicity. Urinary excretion was prompt and effective, and excellent visualizations of the kidneys and urinary bladder were obtained.

(d) A mixture of 30.7 g. of 3,5-diacetamido-2,4,6-triiodobenzoic acid, 1.8 g. of calcium oxide and 150 ml. of water was heated on a steam bath for two hours. The reaction mixture was filtered, and acetone was added to the filtrate while hot to the point of turbidity. The solution was cooled to 0° C. and the solid which separated was collected by filtration, washed with acetone and ether and dried at 100° C., giving 20 g. of 3,5-diacetamido-2,4,6-triiodobenzoic acid in the form of its calcium salt.

*Analysis.*—Calcd. for $C_{22}H_{16}CaI_6N_4O_8$: I, 60.15; Ca, 3.16. Found: I, 60.8; Ca, 3.19.

(e) To a mixture of 61.4 g. of 3,5-diacetamido-2,4,6-triiodobenzoic acid and 8 g. of diethylamine was added sufficient water to effect solution at the boiling point. The solution was filtered and acetone was added to the filtrate to the point of turbidity. The solid material which separated upon cooling was collected by filtration and dried at 100° C. for eighteen hours, giving 26 g. of 3,5-diacetamido-2,4,6-triiodobenzoic acid in the form of its diethylammonium salt, M.P. about 291° C. (dec.).

*Analysis.*—Calcd. for $C_{11}H_9I_3N_2O_4 \cdot C_4H_{11}N$: I, 55.4; N, 6.11. Found: I, 55.4; N, 6.13.

(f) To a mixture of 61.4 g. of 3,5-diacetamido-2,4,6-triiodobenzoic acid and 10 ml. of concentrated ammonium hydroxide heated at 90° C. was added sufficient water to effect solution. The mixture was filtered and the filtrate cooled to 10° C. The mixture was allowed to come to room temperature and the solid material was collected by filtration and dried, giving 34 g. of 3,5-diacetamido-2,4,6-triiodobenzoic acid in the form of its ammonium salt, M.P. 278° C. (dec.).

*Analysis.*—Calcd. for $C_{11}H_9I_3N_2O_4 \cdot NH_3$: I, 60.34; N, 6.66. Found: I, 60.10; N, 6.62.

If in part (a) of this example iodine monochloride is replaced by bromine and the subsequent steps carried out as described, there is obtained 3,5-diacetamido-2,4,6-tribromobenzoic acid and salts thereof.

EXAMPLE 21

3,5-Dipropionamido-2,4,6-Triiodobenzoic Acid 3,5-diamino-2,4,6-triiodobenzoic acid (35 g.), prepared as described in Example 20, was dissolved in 160 ml. of propionic anhydride by heating on a steam bath, and 7 drops of concentrated sulfuric acid were added. The reaction mixture was cooled, the solid product was collected by filtration and dissolved in 10% sodium hydroxide solution. The alkaline solution was filtered, and the filtrate was made strongly acid with hydrochloric acid, giving 35 g. of product, M.P. above 300° C. This material was combined with 12 g. from another run, and recrystallized twice from dimethylformamide using water to bring about crystallization. The recrystallized material was converted to the diethanolamine salt by warming with an excess of diethanolamine in ethanol solution, giving 32.6 g. of 3,5-dipropionamido-2,4,6-triiodobenzoic acid in the form of its diethanolamine salt, which melts about 235° C., then resolidifies and remelts with decomposition about 278° C. An aqueous solution of the diethanolamine salt was acidified to give 25.3 g. of 3,5-dipropionamido-2,4,6-triiodobenzoic acid, M.P. above 300° C. with decomposition.

Neut. Equiv. Calcd.: 642. Found: 647.

Analysis.—Calcd. for $C_{13}H_{13}I_3N_2O_4$: I, 59.3. Found: I, 59.7.

EXAMPLE 22

3,5-Dibutyramido-2,4,6-Triiodobenzoic Acid

A mixture of 35.7 g. of 3,5-diamino-2,4,6-triiodobenzoic acid, prepared as described in Example 20, 100 ml. of butyric anhydride and 10 drops of concentrated sulfuric acid was heated on a steam bath for fifteen minutes. The reaction mixture was cooled, and the solid material was collected by filtration and washed with petroleum ether (Skellysolve B). The product was dissolved in warm ethanol, the solution was decolorized with charcoal, and the product caused to separate by the addition of water after cooling. The product was filtered, collected by filtration, washed with acetone and petroleum ether and dried at 70° C. for three days, giving 14.1 g. of 3,5-dibutyramido-2,4,6-triiodobenzoic acid, M.P. above 300° C. with decomposition.

Neut. Equiv. Calcd.: 670. Found: 674.

Analysis.—Calcd. for $C_{15}H_{17}I_3N_2O_4$: I, 56.8. Found: I, 56.9.

EXAMPLE 23

(a) *3-nitro-5-valeramidobenzoic acid.*—To a refluxing solution of 18.2 g. of 5-amino-3-nitrobenzoic acid in 200 ml. of toluene was added 12.5 g. of n-valeryl chloride, and the mixture was refluxed for three hours. The solid material which separated was collected by filtration, washed with benzene and dried, giving 24 g. of 3-nitro-5-valeramidobenzoic acid, M.P. 196–199° C. A sample of the compound when recrystallized from ethanol and dried at 70° C. had the M.P. 206–208° C.

Neut. Equiv. Calcd.: 266. Found: 267.

Analysis.—Calcd. for $C_{12}H_{14}N_2O_5$: N(nitro group), 5.26. Found: N(nitro group), 5.30.

(b) *3-amino-5-valeramidobenzoic acid.* — 3-nitro-5-valeramidobenzoic acid (112 g.) was dissolved in 750 ml. of warm water containing 77 g. of hydrazine hydrate. Raney nickel was then added in small amounts until about one teaspoonful had been added, and the mixture was warmed on a steam bath until evolution of gas had ceased. The catalyst was removed by filtration, the filtrate was acidified with acetic acid, and the solid which separated was collected by filtration, washed with water and dried, giving 86 g. of 3-amino-5-valeramidobenzoic acid. The analytic sample was recrystallized from ethanol and had the M.P. 230–230.5° C. (dec.).

Neut. Equiv. Calcd.: 236. Found: 235.

Analysis.—Calcd. for $C_{12}H_{16}N_2O_3$: N, 11.86 Found: N, 11.88.

(c) *3-amino-5-valeramido-2,4,6-triiodobenzoic acid.*—To a suspension of 26.6 g. of 3-amino-5-valeramidobenzoic acid in water was added 150 ml. of 1.725 N potassium iododichloride solution, and the mixture was stirred for thirty minutes. The reaction mixture was warmed to 40° C. and then cooled to room temperature, and 180 ml. of 2 N sodium hydroxide solution was then added. Additional potassium iododichloride solution (122 ml.) was then added, and the mixture was stirred for thirty minutes at 40° C. and then allowed to cool. The solid material which separated was collected by filtration, washed with water, taken up in dilute sodium hydroxide solution, decolorized with sodium bisulfite and reprecipitated with hydrochloric acid. The crude product was converted to its ammonium salt by dissolving it in ammonium hydroxide solution and salting it out with ammonium chloride. The precipitated ammonium salt was dissolved in 2.5 liters of hot water, decolorized with charcoal and acidified with hydrochloric acid. The precipitated acid was collected by filtration, washed with water and dried, giving 30 g. of 3-amino-5-valeramido-2,4,6-triiodobenzoic acid, M.P. 236.5–237° C. (dec.).

Analysis.—Calcd. for $C_{12}H_{13}I_3N_2O_3$: I, 62.1. Found: I, 62.2.

EXAMPLE 24

(a) *5-isocaproamido-3-nitrobenzoic acid.*—To a refluxing solution of 18.2 g. of 5-amino-3-nitrobenzoic acid in 250 ml. of toluene was slowly added 14 g. of isocaproyl chloride, and the mixture was refluxed for two hours. The solid material which formed was collected by filtration, washed with benzene, dilute hydrochloric acid and water, dried and recrystallized from dilute ethanol, giving 23 g. of 5-isocaproamido-3-nitrobenzoic acid, M.P. 206–207° C.

Neut. Equiv. Calcd.: 280. Found: 283.

Analysis.—Calcd. for $C_{13}H_{16}N_2O_5$: N(nitro group), 5.00. Found: N(nitro group), 5.05.

(b) *3-amino-5-isocaproamidobenzoic acid* was prepared from 13 g. of 3-nitro-5-isocaproamidobenzoic acid and 9 g. of hydrazine hydrate in the presence of Raney nickel according to the manipulative procedure described above in Example 23, part (b). There was thus obtained 7 g. of 3-amino-5-isocaproamidobenzoic acid, M.P. 224–225° C.

Neut. Equiv. Calcd.: 250. Found: 250.

Analysis.—Calcd. for $C_{13}H_{18}N_2O_3$: N, 11.2. Found: N, 11.3.

(c) *3-amino-5-isocaproamidobenzoic acid* can be iodinated with potassium iododichloride according to the manipulative procedure given above in Example 5, part (a) to give 3-amino-5-isocaproamido-2,4,6-triiodobenzoic acid. The latter can be acetylated with acetic anhydride according to the manipulative procedure given above in Example 12 to give 3-acetamido-5-isocaproamido-2,4,6-triiodobenzoic acid.

EXAMPLE 25

(a) *3-nitro-5-isovaleramidobenzoic acid* was prepared from 91 g. of 3-nitro-5-aminobenzoic acid and 65 ml. of isovaleryl chloride according to the manipulative procedure described above in Example 24, part (a). The 90 g. of 3-nitro-5-isovaleramidobenzoic acid thus obtained was recrystallized from dilute methanol giving a sample with the M.P. 223–224° C. (dec.).

Neut. Equiv. Calcd.: 266. Found: 267.

Analysis.—Calcd. for $C_{12}H_{14}N_2O_5$: N(nitro group), 5.27. Found: N(nitro group), 5.34.

(b) *3-amino-5-isovaleramidobenzoic acid* was prepared from 18.2 g. of 5-amino-3-nitrobenzoic acid and 12.5 g. of isovaleryl chloride followed by reduction of the intermediate 3-nitro-5-isovaleramidobenzoic acid with hydrazine hydrate and Raney nickel according to the manipulative procedures described above in Example 23, parts (a) and (b). There was thus obtained 13 g. of 3-amino-5-isovaleramidobenzoic acid which when recrystallized from dilute ethanol had the M.P. 242.5–243.5° C. (dec.).

Neut. Equiv. Calcd.: 236. Found: 232.

Analysis.—Calcd. for $C_{12}H_{16}N_2O_3$: N, 11.8. Found: N, 11.7.

(c) *3-amino-5-isovaleramidobenzoic acid* can be iodinated with potassium iododichloride according to the manipulative procedure given above in Example 5, part (a) to give 3-amino-5-isovaleramido-2,4,6-triiodobenzoic acid. The latter can be acetylated with acetic anhydride according to the manipulative procedure given above in Example 12 to give 3-acetamido-5-isovaleramido-2,4,6-triiodobenzoic acid.

EXAMPLE 26

(a) *3-nitro-5-caproamidobenzoic acid* was prepared from 18.2 g. of 5-amino-3-nitrobenzoic acid and 14 g. of caproyl chloride according to the manipulative procedure described above in Example 23, part (a). After purification of the crude product through the ammonium salt and recrystallization from dilute ethanol there was obtained 14 g. of 3-nitro-5-caproamidobenzoic acid, M.P. 190–191° C.

Neut. Equiv. Calcd.: 280. Found: 278.

(b) *3-amino-5-caproamidobenzoic acid* was prepared from 14 g. of 3-nitro-5-caproamidobenzoic acid and .10 ml. of hydrazine hydrate in the presence of Raney nickel according to the manipulative procedure described above in Example 23, part (b). There was thus obtained 10 g. of 3-amino-5-caproamidobenzoic acid, M.P. 205–207° C.

Neut. Equiv. Calcd.: 250. Found: 248.

(c) *3-amino-5-caproamidobenzoic acid* can be iodinated with potassium iododichloride according to the manipulative procedure given above in Example 5, part (a) to give 3-amino-5-caproamido-2,4,6-triiodobenzoic acid. The latter can be formylated with formic acid according to the manipulative procedure described above in Example 6 to give 3-formamido-5-caproamido-2,4,6-triiodobenzoic acid.

EXAMPLE 27

(a) *3-nitro-5-heptanoamidobenzoic acid* was prepared from 18.2 g. of 3-nitro-5-aminobenzoic acid and 25 ml. of heptanoyl chloride according to the manipulative procedure described above in Example 23, part (a). After dissolving the product in dilute ammonium hydroxide, filtering the solution and acidifying it with hydrochloric acid, there was obtained 18 g. of 3-nitro-5-heptanoamidobenzoic acid, M.P. 172–174° C.

(b) *3-amino-5-heptanoamidobenzoic acid* was prepared from 18 g. of 3-nitro-5-heptanoamidobenzoic acid and 13 ml. of hydrazine hydrate in the presence of Raney nickel according to the manipulative procedure described above in Example 23, part (b). The product was recrystallized from dilute methanol, giving 10.5 g. of 3-amino-5-heptanoamidobenzoic acid, M.P. 186–189° C.

Neut. Equiv. Calcd.: 264. Found: 266.

(c) *3-amino-5-heptanoamidobenzoic acid* can be iodinated with potassium iododichloride according to the manipulative procedure given above in Example 5, part (a) to give 3-amino-5-heptano-amido-2,4,6-triiodobenzoic acid. The latter can be propionylated with propionic anhydride according to the manipulative procedure described above in Example 3 to give 3-propionamido-5-heptanoamido-2,4,6-triiodobenzoic acid.

EXAMPLE 28

*5-Acetamido-3-Aminodiiodobromobenzoic Acid*

5-acetamido-3-aminodiiodobenzoic acid (23 g.), obtained as described above in Example 1, part (d), was dissolved in 250 ml. of water containing 25 ml. of 2 N sodium hydroxide. To this there was added 10 g. of bromine, and the mixture was stirred for ten minutes and then allowed to stand at room temperature for about fifteen hours. The solid which formed was collected by filtration, washed with water, and recrystallized twice from dilute ethanol and then from dilute dimethylforamide, giving about 10 g. of 5-acetamido-3-aminodiiodobromobenzoic acid, M.P. about 260° C.

This application is a continuation-in-part of Larsen application Serial No. 345,257, filed March 27, 1953 and now abandoned.

I claim:

1. A member of the group consisting of a compound having the formula

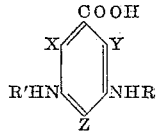

wherein X, Y and Z are members of the group consisting of hydrogen, bromine and iodine, at least two of X, Y and Z being halogen, and R and R' are members of the group consisting of hydrogen, lower-alkanoyl, hydroxy-lower-alkanoyl and lower-alkanoyloxy-lower-alkanoyl radicals, at least one of R and R' being an acyl radical, and the sum of the number of carbon atoms in R and R' being no greater than ten and non-toxic salts thereof.

2. A 3-amino - 5 - lower-alkanoylaminodiiodobenzoic acid.

3. A 3-lower-alkanoylamino-5-lower-alkanoylamino-diiodobenzoic acid.

4. 3-lower-alkanoylamino - 5 - lower - alkanoylamino-2,4,6-triiodobenzoic acid.

5. A 3-amino-5-lower-alkanoylamino-2,4,6-triiodobenzoic acid.

6. 3,5-diacetamido-2,4,6-triiodobenzoic acid.

7. 3,5-dipropionamido-2,4,6-triiodobenzoic acid.

8. 3-amino-5-acetamido-2,4,6-triiodobenzoic acid.

9. 3-acetamido-5-formamido-2,4,6-triodobenzoic acid.

10. 3-acetamido-5-propionamido - 2,4,6-triiodobenzoic acid.

11. 3 - acetamido - 5 - butyramido-2,4,6-triiodobenzoic acid.

12. 3 - acetamido - 5 - isocaproamido-2,4,6-triiodobenzoic acid.

13. 3-acetamido - 5 - acetoxyacetamido-2,4,6-triiodobenzoic acid.

14. 3-acetamido - 5 - hydroxyacetamido-2,4,6-triiodobenzoic acid.

15. 3,5-dibutyramido-2,4,6-triiodobenzoic acid.

16. A water-soluble non-toxic salt of a 3-lower-alkanoylamino-5-lower-alkanoylamino - 2,4,6 - triiodobenzoic acid.

17. A water-soluble non-toxic salt of 3,5-diacetamido-2,4,6-triiodobenzoic acid.

18. Sodium 3,5-diacetamido-2,4,6-triiodobenzoate.

19. A water-soluble, non-toxic salt of 3,5-dipropionamido-2,4,6-triiodobenzoic acid.

20. A compound of the general formula:

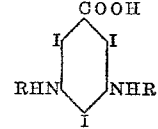

wherein each R group is a lower aliphatic carboxylic acid acyl radical.

21. A water-soluble, non-toxic salt of a compound of the general formula:

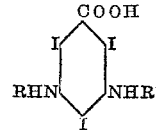

wherein each R group is a lower aliphatic carboxylic acid acyl radical.

References Cited in the file of this patent

UNITED STATES PATENTS

| | | |
|---|---|---|
| 1,938,031 | Laska et al. | Dec. 5, 1933 |
| 2,611,786 | Wallingford | Sept. 23, 1952 |
| 2,653,971 | Balch | Sept. 29, 1953 |
| 2,680,133 | Wallingford | June 1, 1954 |

OTHER REFERENCES

Blanksma: Chem. Abst. 8, p. 1579 (1914).
Beilstein: 4th Ed., vol. XIV, p. 455.
Beilstein: 4th Ed., vol. XIV, 2nd Supp., p. 245. (Copies in Library.)